United States Patent [19]

Capek et al.

[11] Patent Number: 5,333,272
[45] Date of Patent: Jul. 26, 1994

[54] WARNING TIMER FOR USERS OF INTERACTIVE SYSTEMS

[75] Inventors: Peter G. Capek, Ossining; Robert J. Marinelli, Pound Ridge, both of N.Y.

[73] Assignee: International Business Machines Corporation, Armonk, N.Y.

[21] Appl. No.: 714,461

[22] Filed: Jun. 13, 1991

[51] Int. Cl.$^5$ .......................................... G06F 15/02
[52] U.S. Cl. .................................................. 395/275
[58] Field of Search .............. 395/550, 275; 364/143, 364/242, 286.3, 267.9, 231.6, 551.01; 371/16.3, 19

[56] References Cited

U.S. PATENT DOCUMENTS

| | | | |
|---|---|---|---|
| 4,849,919 | 7/1989 | Haneda | 364/569 |
| 4,872,110 | 10/1989 | Smith et al. | 364/240.9 |
| 4,930,093 | 5/1990 | Houser et al. | 395/550 |
| 4,954,956 | 9/1990 | Yamakawa et al. | |
| 5,040,158 | 8/1991 | Lee et al. | 368/10 |
| 5,097,470 | 3/1992 | Gihl | 371/16.3 |

OTHER PUBLICATIONS

Mead Data Central, Lexis/Nexis Software Manual, 1987.
IBM Technical Disclosure Bulletin, vol. 31, No. 12, May 1989.

*Primary Examiner*—Dale M. Shaw
*Assistant Examiner*—Moustafa M. Meky
*Attorney, Agent, or Firm*—Sterne, Kessler, Goldstein & Fox

[57] ABSTRACT

A warning timer adapted for use in an interactive data processing system which generates an alarm when a user receives output at an input/output device when he or she is not likely to be paying attention to the input-/output device. The user is assumed to be paying attention for a specified amount of time after he or she last sent a request to a computer or received a response from the computer. The specified amount of time corresponds to the length of the user's attention span. The warning timer operates as follows. When the user receives a response, it calculates the amount of time that has elapsed since the user last sent a request or received a response. If the elapsed time exceeds the specified amount of time, it generates an alarm to alert the user.

9 Claims, 6 Drawing Sheets

WARNING TIMER FOR USERS OF INTERACTIVE SYSTEMS

TECHNICAL FIELD

The present invention relates generally to a method or apparatus for increasing the efficiency of a user of a data processing system. More particularly, the present invention relates to a method or apparatus for alerting a user when an interactive data processing system sends him or her data or an indication that some action has been completed.

BACKGROUND ART

A user of an interactive system requests data or action from the system by manipulating an input means of an input/output device. The system processes the request and displays a response on a display means of the input/output device. The response is often displayed immediately. Occasionally, however, it will be delayed by a substantial or unpredictable amount of time. The sources of such delays include the computation time required to generate the response, the number and nature of other processes the data processing system is currently handling, and the load and bandwidth of the communication network connecting the input/output device to the data processing system.

An interactive data processing system also sends unsolicited responses to the user. An unsolicited response is a response which the user did not request. The time at which an unsolicited response will occur is generally unpredictable.

Therefore, the user of an interactive data processing system must either continuously monitor the output device for responses, or perform unrelated tasks and periodically check the display means to determine whether a response has occurred. Making such a determination is particularly difficult for responses that cause only minor changes to the display means. Such monitoring or checking frustrates the user and results in inefficient use of his or her time.

One conventional approach to reduce user frustration and inefficiency is an interactive data processing system which generates an audible alarm upon each response. For example, the Mead Data Central LEXIS/NEXIS communications software generates an audio tone each time the system finishes displaying a screen of text. Because responses are often displayed immediately, the alarm is often unnecessary. Unnecessary alarms distract and annoy the user as well as other people in the vicinity. Furthermore, they typically cause the user to ignore all alarms or turn the alarm feature off. Therefore, the first approach addresses user frustration and inefficiency only with respect to responses which are not displayed immediately.

A second conventional approach is an application program of an interactive data processing system which generates an alarm upon each unsolicited response. For example, electronic mail programs commonly alert a user when he or she receives mail. By freeing the user from having to periodically check his or her electronic mailbox, the second approach addresses user frustration and inefficiency with respect to unsolicited responses from the application program.

A third approach is a data processing system with windowing capabilities (called a windowing system) which generates an alarm upon each response issued to an obscured or iconified window. An iconified window is a window which has been replaced with an icon representative of the window. Obscuring or iconifying a window temporarily converts it to a form in which it takes up little space on the display means of the input/output device. A user typically obscures or iconifies a window when he or she need not interact with the application program or programs running in it. By freeing the user from having to periodically check the status of obscured and iconified windows, the third approach addresses user frustration and inefficiency with respect to programs not currently being used interactively.

Therefore, what is needed is an interactive data processing system capable of selectively and unobtrusively alerting the user when an application program sends a response, whether or not the response is solicited and whether or not the application program is presently being used interactively.

DISCLOSURE OF INVENTION

The present invention is directed towards a warning timer for an interactive data processing system which generates an alarm when a user receives a response at an input/output device when he or she is not likely to be paying attention to the input/output device. While requesting data or action from a computer through the input/output device, a user is necessarily paying attention to the input/output device. Therefore, if the user receives a response at the input/output device while sending a request, he or she need not be further alerted of the response. Similarly, if the user receives a response soon after he or she has sent a request, he or she is probably still paying attention to the input/output device and again need not be further alerted of the response.

The warning timer therefore only alerts the user upon responses received a specified amount of time after he or she last sent a request, regardless of whether the response was solicited and whether the response was from an application program which at the time was being used interactively. The specified amount of time corresponds to the length of the user's attention span.

The warning timer operates as follows. When the user receives a response, it calculates the amount of time that has elapsed since the user last sent a request. If that amount of time exceeds the specified amount of time, it generates an alarm to alert the user.

The foregoing and other objects, features and advantages of the invention will be apparent from the following more particular description of preferred embodiments of the invention, as illustrated in the accompanying drawings.

BRIEF DESCRIPTION OF DRAWINGS

The present invention will be more fully understood with reference to the accompanying drawings in which.

BEST MODE FOR CARRYING OUT THE INVENTION

The present invention is a computer-based warning timer system and method for a data processing system which alerts a user (operator) when the computer sends a response while the user is assumed not to be paying attention to an input/output device (typically a CRT displaying a graphical interface).

The present invention can be implemented in hardware, software, and in hardware/software combinations. Preferred implementations are a hardware or firmware module of an input/output device and a software module of a window manager. Any computer language can be used for coding the present invention.

Figure 4:
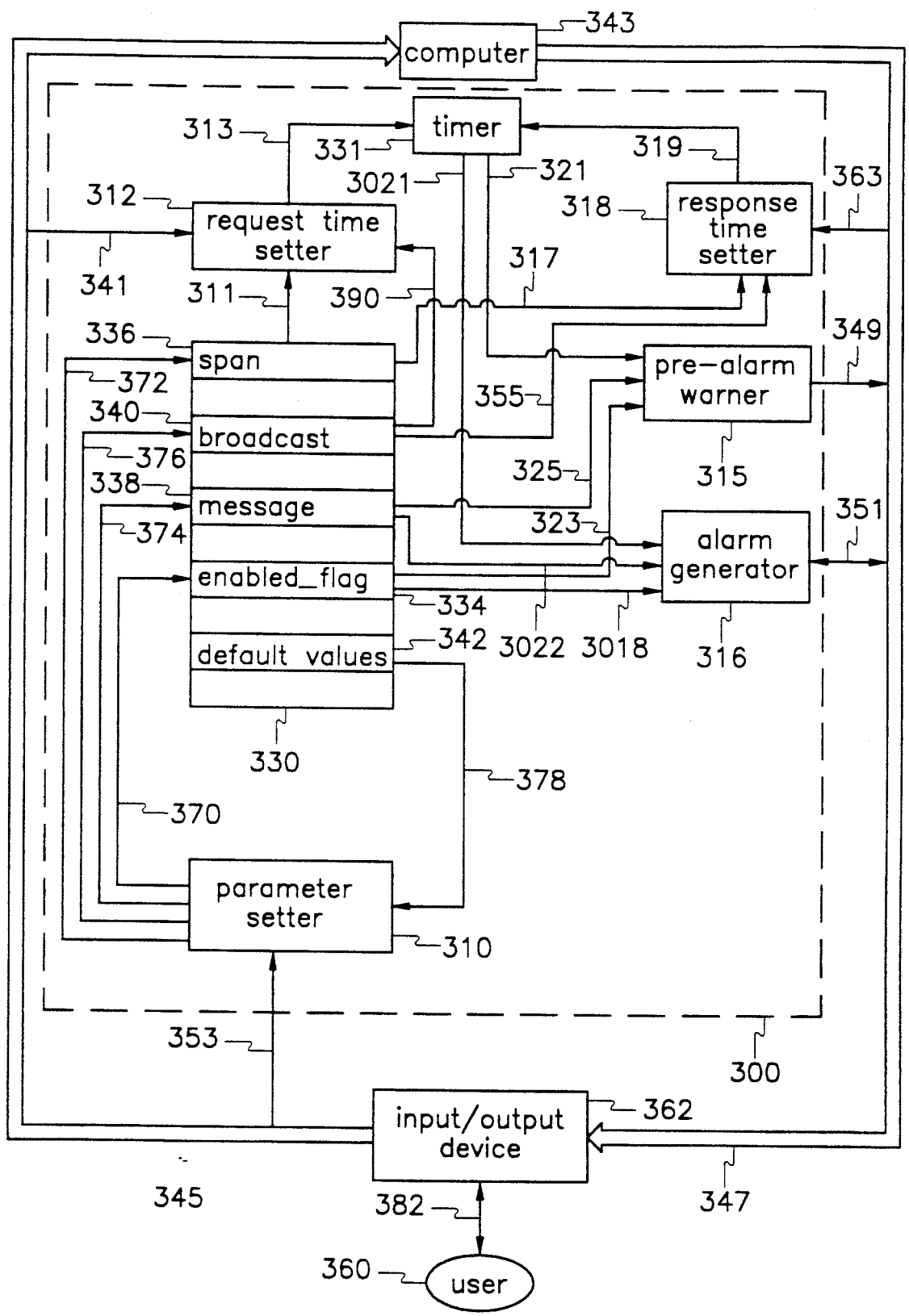
FIG. 4 shows a block diagram of the warning timer of FIG. 2.

FIG. 4 shows a block diagram of one possible structure of a warning timer 300 of the present invention. The warning timer 300 comprises six functional units or submodules: a parameter setter 310, a request time setter 312, a timer 331, a pre-alarm warner 315, an alarm generator 316, and a response time setter 318. The functional units or submodules interact with a number of parameters stored in variables or registers in a memory 330. The parameters include an enabled_flag 334, a span 336, a message 338, a broadcast 340 and default values 342. The warning timer 300 is connected to a computer 343 and an input/output device 362 via an input path 345 and an output path 347.

The parameter setter 310 initializes the parameters 334, 336, 338 and 340. Specifically, it receives input from the default values 342 to set the initial value for each parameter. It sets enabled_flag 334, span 336, message 338, and broadcast 340 via paths 370, 372, 374 and 376, respectively, to the initial values.

Additionally, the parameter setter 310 enables a user 360 to modify the values of the parameters 334, 336, 338 and 340 at any time. Specifically, via a path 382, the user 360 can enter a new value for a parameter on the input/output device 362. The parameter setter 310 receives the new value via a path 353 from the input path 345. The parameter setter 310 then sets enabled_flag 334, span 336, message 338, or broadcast 340 via path 370, 372, 374 or 376, respectively, to the new value.

The timer 331 decrements its value at a regular time interval. Specifically, it reduces its value by one every second until the value is zero. As will be explained, the request time setter 312 and the response time setter 318 reset the timer upon each request and response. Therefore, the value of the timer 331 indicates the amount of time that has elapsed since the last request or response.

The request time setter 312 resets the timer 331 when the user 360 sends requests to the computer 343. Specifically, when a request is sent to the computer 343 from the input/output device 362, the request time setter 312 is triggered by a signal on a path 341 from the input path 345. The request time setter 312 resets the timer 331 to the value of span 336. The request time setter 312 determines the value of span 336 from a path 311, and sets the timer 331 to that value via a path 313.

Note that if implemented on a multiprogramming computer, multiple instances of the warning timer 300 could operate concurrently. A multiprogramming computer is a computer which can run more than one program at any particular time. In such an implementation, an instance of the memory 330 is associated with each instance of the warning timer 300. Each instance of the memory 330 stores the parameters associated with an instance of the warning timer 300. On a multiprogramming computer, one instance of the warning timer 300 could be associated with each application program currently running. Alternatively, on a windowing system, one instance could be associated with each window.

In an implementation where there could be multiple instances of the warning timer 300, the request time setter 312 resets the timer 331 for an instance upon a request to an application program or from a window associated with the same instance. The request time setter 312 ascertains the value of broadcast 340 (via a path 390) to determine whether to reset the timer 331 upon a request to an application program or from a window not associated with the same instance. Broadcast 340 is explained in detail below, in the text discussing the implementation on a windowing system.

The response time setter 318 resets the timer 331 to the value of span 336 when the computer 343 sends responses to the user 360. Specifically, when the computer 343 sends a response to the input/output device 362, the response time setter 318 is triggered by a signal on a path 363 from the output path 347. The response time setter 318 resets the timer 331 to the value of span 336. The response time setter 318 determines the value of span 336 from a path 317, and sets the timer 331 to that value via a path 319.

In an implementation where there could be multiple instances of the warning timer 300, the response time setter 318 resets the timer 331 for an instance upon a response from an application program or to a window associated with the same instance. The response time setter 318 ascertains the value of broadcast 340 (via a path 355) to determine whether to reset the timer 331 upon a response from an application program or to a window not associated with the same instance.

The pre-alarm warner 315 alerts the user 360 when the timer 331 reaches zero, indicating that if the user 360 does not send a request before the next response, the next response will trigger an alarm. Specifically, the pre-alarm warner 315 works as follows. A signal on a path 321 triggers the pre-alarm warner 315 when the value of the timer 331 reaches zero. The pre-alarm warner 315 determines the value of enabled_flag 334 via a path 323. If enabled_flag 334 indicates that the warning timer 300 is enabled, the pre-alarm warner 315 sends a warning to the input/output device 362 by placing a signal on a path 349 to the output path 347. The pre-alarm warner 315 determines certain characteristics of the warning from the value of message 338, to which it is connected by a path 325. The characteristics indicated by message 338 include the type of warning (visual, audible, or both) as well as the attributes of each type. The attributes could be, for example, a color to change the background of the display means to, a number of beeps, or a textual message. An appropriate warning from the pre-alarm warner would be a change in the color or shade of a border of a window.

The alarm generator 316 alerts the user when the computer 343 sends the user 360 a response when the value of the timer 331 is zero. Specifically, the alarm generator 316 works as follows. A signal on a path 351 from the output path 347 triggers the alarm generator 316 when the computer 343 sends a response to the input/output device 362. If at that time the value of the timer 331 (indicated by a path 3021) is zero and the enabled—flag 334 (indicated by a path 3018) indicates that the warning timer 300 is enabled, the alarm generator 316 sends an alarm to the input/output device 362. The value of message 338 (indicated by a path 3022), indicates the characteristics of the alarm. The characteristics of the alarm could differ from those of the warning generated by the pre-alarm warner 315.

Figure 5:
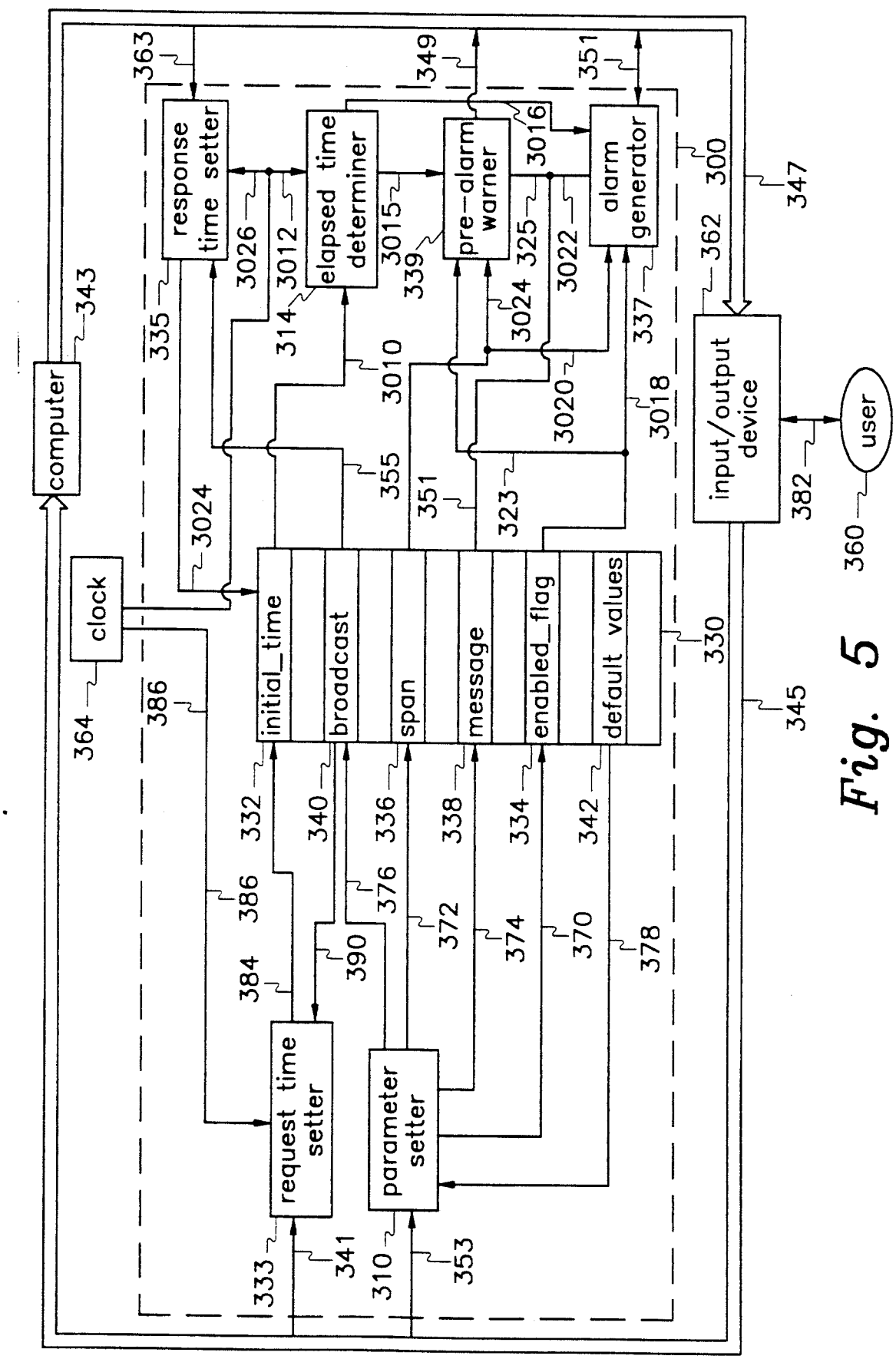
FIG. 5 shows a block diagram of the warning timer of FIG. 3.

FIG. 5 shows a second possible structure of the warning timer 300 in which the timer 331 is replaced with a clock 364, a register or variable called initial—time 332 and a functional block or submodule called elapsed time determiner 314. The operation of the other functional blocks or submodules of FIG. 5 differs from the operation of the corresponding functional blocks or submodules in FIG. 4 as follows.

In FIG. 5, the request time setter 333 sets initial—time 332 to the current value of the clock 364 when the user 360 sends requests to the computer 343. Specifically, when a request is sent, the request time setter 333 is triggered by a signal on a path 341 from the input path 345. The request time setter 333 receives the current time from the clock 364 via a path 386, and sets initial—time 332 to the current time via a path 384.

In an implementation where there could be multiple instances of the warning timer 300, the request time setter 333 sets initial time 332 for an instance to the current time upon a request to an application program or from a window associated with the same instance. The request time setter 333 ascertains the value of broadcast 340 (via a path 390) to determine whether to set initial—time 332 to the current time upon a request to an application program or from a window not associated with the same instance.

The response time setter 335 sets initial—time 332 to the current value of the clock 364 when the computer 343 sends responses to the input/output device 362. Specifically, when a response is sent, the response time setter 335 is triggered by a signal on a path 363 from the output path 347. The response time setter 335 receives the current time from the clock 364 via a path 3026, and sets initial—time 332 to the current time via a path 3024.

In an implementation where there could be multiple instances of the warning timer 300, the response time setter 335 sets initial time 332 for an instance to the current time upon a response from an application program or to a window associated with the same instance. The request time setter 333 ascertains the value of broadcast 340 (via a path to determine whether to set initial—time 332 to the current time upon a response from an application program or to a window not associated with the same instance.

The elapsed time determiner 314 determines the amount of time between initial—time 332 and the current time. Specifically, it operates as follows. Periodically, the elapsed time determiner 314 subtracts the value of initial—time 332 (ascertained via a path 3010) from the current time (ascertained via a path 3012 from the clock 364).

The pre-alarm warner 339 monitors the continually increasing difference calculated by the elapsed time determiner 314 via a path 3015. When the difference becomes greater than the value of span 336 (ascertained via a path 3024), then if the warning timer 300 is enabled (ascertained via a path 323 to enabled—flag 334), the pre-alarm warner 339 sends a warning to the input/output device 362 through a path 349 to the output path 347. The pre-alarm warner 339 determines the characteristics of the warning via the path 325 from message 338.

The alarm generator 337 is triggered by a signal on a path 351 from the output path 347 when the computer 343 sends a response to the input/output device 362. If at that time the warning timer 300 is enabled (as indicated by the path 3018 to enabled—flag 334) then the alarm generator 337 sends an alarm via the path 351 to the output path 347 and, ultimately, the input/output device 362. The alarm generator 337 determines the characteristics of the alarm via the path 3022 from message 338.

The method of the present invention is, in summary, as follows. The user 360 is assumed to have a limited attention span. The user 360 is further assumed to be paying attention to the input/output device 362 whenever he or she sends a request via the input path 345 from it to the computer 343 or receives a response via the output path 347 to it from the computer 343. The present invention therefore alerts the user 360 any time the computer issues a response more than a predetermined amount of time after the last request or response. The predetermined amount of time indicates the estimated length of the user's attention span and is stored in span 336.

A more detailed explanation of the method of the present invention is as follows. When an instance of the current invention is invoked, the parameter setter 310 initializes the parameters in memory 330. It does so by setting enabled—flag 334, span 336, message 338, and broadcast 340 to the values in default values 342.

When the user 360 sends a request from the input/output device 362 via the input path 345 to the computer 343, either the request time setter 312 sets the timer 331 to the value of span 336 (for the structure of FIG. 4) or the request time setter 333 records the current time in initial—time 332 (for the structure of FIG. 5).

When the amount of time that has elapsed since the last request or response exceeds the value of span 336, then if the warning timer 300 is enabled, the pre-alarm warner 315 (or 339, in the structure of FIG. 5) warns the user 360 that the alarm will sound upon the next response unless it is preceded by a request. The characteristics of the warning are specified by the value of message 338.

Figure 2:
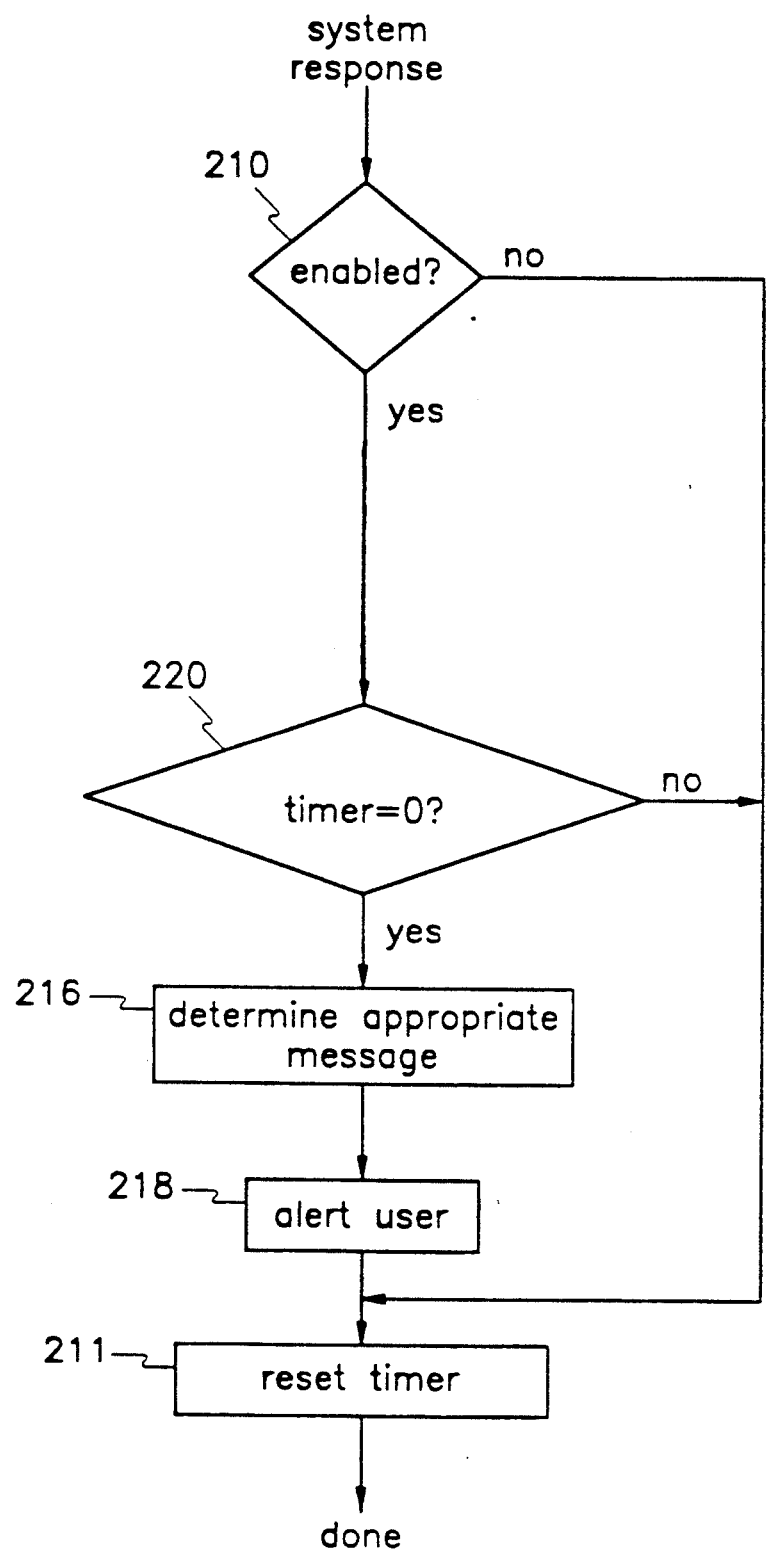
FIG. 2 shows a flowchart of the operation of a first embodiment of the warning timer of the present invention.

When the user 360 receives a response, the method of the present invention as implemented in the structure of FIG. 4 is as follows and as illustrated by flowchart of FIG. 2. First, a decision step 210, represented by a diamond, is performed to determine whether the warning timer 300 is enabled by checking the value of enabled—flag 334. This step 210 is performed by the alarm generator 316.

If the decision of step 210 is negative (as indicated by a "no"), an execution step 211, represented by a rectangle, is performed to reset the timer 331. The step 211 is performed by the response time setter 335. No alarm is sent.

Otherwise, a decision step 220 is performed to determine if the timer 331 is zero. The step 220 is performed in the alarm generator 316. If the decision of step 220 is negative (as indicated by a "no"), the execution step 211 is performed to reset the timer 331. No alarm is sent.

Otherwise, an alarm is sent to the user 360. Specifically, an execution step 216 is performed to determine the characteristics of the alarm. An execution step 218 is then performed to send the appropriate alarm to the input/output device 362. The steps 216 and 218 are performed by the alarm generator 316. Finally, execution step 211 is performed to reset the timer 331.

Figure 3:
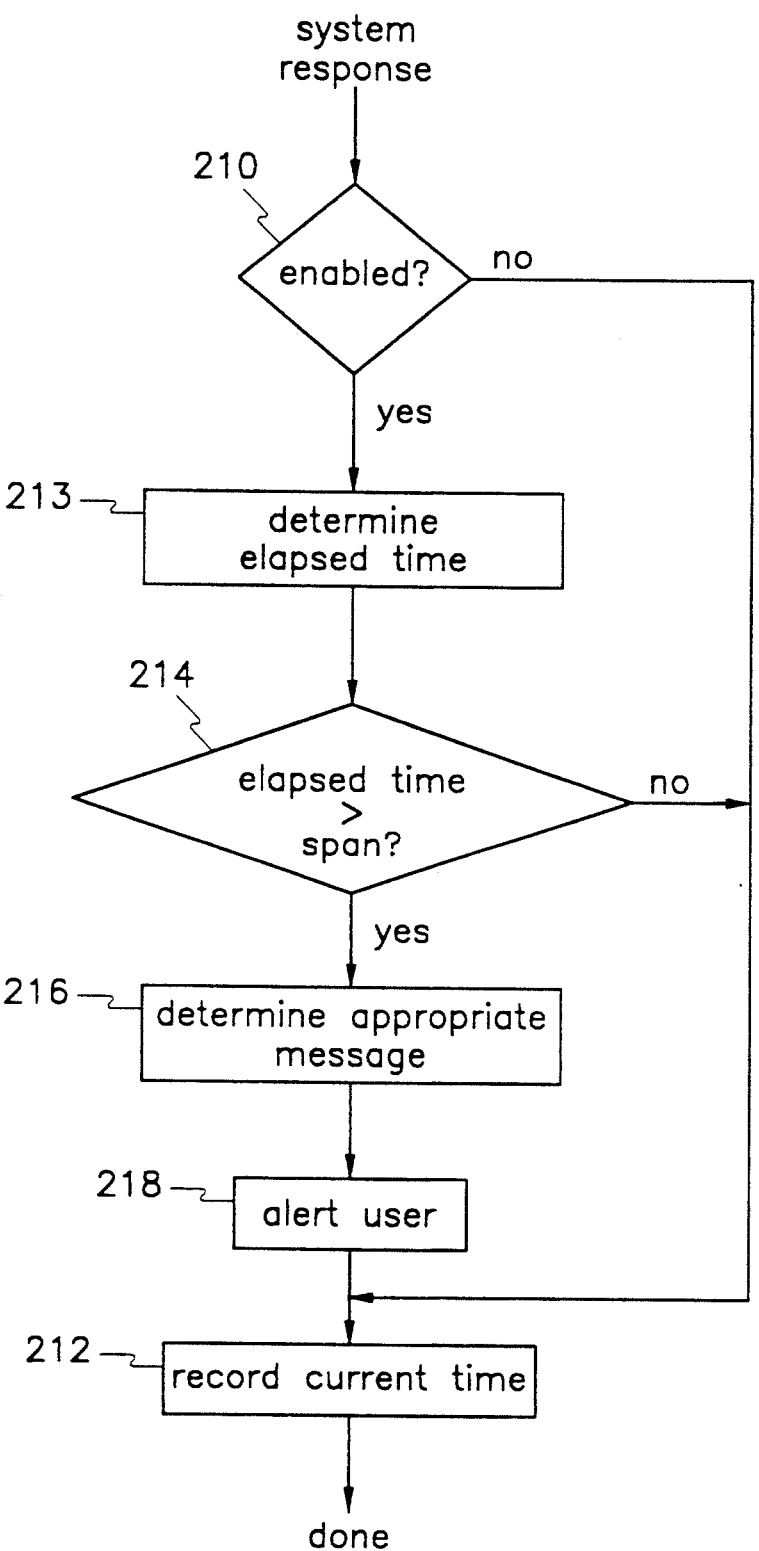
FIG. 3 shows a flowchart of the operation of a second embodiment of the warning timer of the present invention.

When the user 360 receives a response, the method of the present invention as implemented in the structure of FIG. 5 is as follows and as illustrated by flowchart of FIG. 3. First, the decision step 210 is performed to determine whether the warning timer 300 is enabled by checking the value of enabled_flag 334.

If the decision of step 210 is negative (as indicated by a "no"), an execution step 212 is performed to set initial_time 332 to the current time indicated by the clock 364. The step 212 is performed by the response time setter 335. No alarm is sent.

Otherwise, the execution step 213 is performed to determine the amount of time that has elapsed since the last response or request. The step 213 is performed by the elapsed time determiner 314.

Next, decision step 214 is performed to determine whether the elapsed time calculated in step 213 exceeds the value of span 336. The step 214 is performed by the alarm generator 337. If the decision of step 214 is negative (as indicated by a "no"), execution step 212 is performed record the time of the response. No alarm is sent.

Otherwise, an alarm is sent to the user 360. Specifically, the execution step 216 is performed to determine the characteristics of the alarm to send to the input/output device 362. The execution step 218 is then performed to send the appropriate alarm to the input/output device 362. The steps 216 and 218 are performed by the alarm generator 337. Finally, the step 212 is performed to set initial_time 332 to the current time indicated by the clock 364.

A suitable alarm would be generated by instructing the input/output device 362 to generate an audio tone for a short period of time. This is graphically represented by a speaker 412 in FIG. 7. The input/output device 362 is further instructed to generate a visual indication that a warning has been sent, in case the user 360 is away from the input/output device 362 at the time of the warning. This is indicated by a change in color or shade of a border 415 of a visible window 414 of FIG. 7. The visual indication remains visible until the next request from the user 360. The visual indication could be, for example, a change in the color or shade of the background or border of the window with which the alarm is associated, a change in the shape of the cursor, or other graphical representation.

Figure 6:
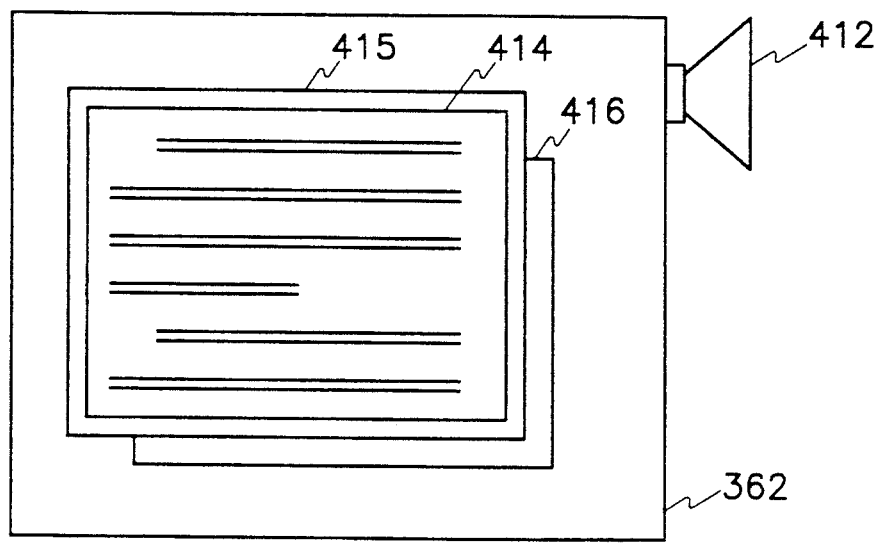
FIG. 6 shows an output device displaying a visible window and a partially obscured window.
Figure 7:
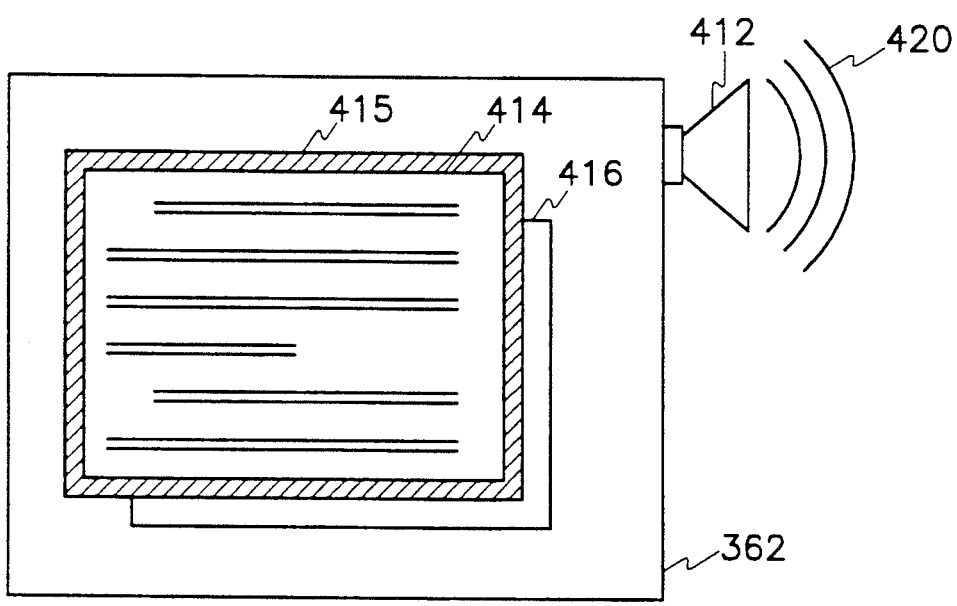
FIG. 7 shows an output device displaying a visible window and a partially obscured window and displaying and sounding an alarm.

Turning now to FIGS. 6 and 7, they show the preferred manner in which the alarm generator 316 (or 337, in the structure of FIG. 5) would alert the user. FIG. 6 shows the input/output device 362 before a warning is sent. In FIG. 6, a display means of the input/output device 362 is displaying the visible window 414 with the border 415 and a partially obscured window 416. Additionally, the input/output device 362 of FIG. 6 shows a speaker 412 for sounding an audible warning. As shown in FIG. 6, the speaker 412 is silent.

FIG. 7 shows the input/output device 362 immediately after the alarm generator 316 instructs it to warn the user 360. As stated above, the warning can be visual, audible, or both. In the representative example shown in FIG. 7, the speaker 412 is generating an audio tone 420 and the color or shading of the border 415 of the visible window 414 has changed.

Figure 1:
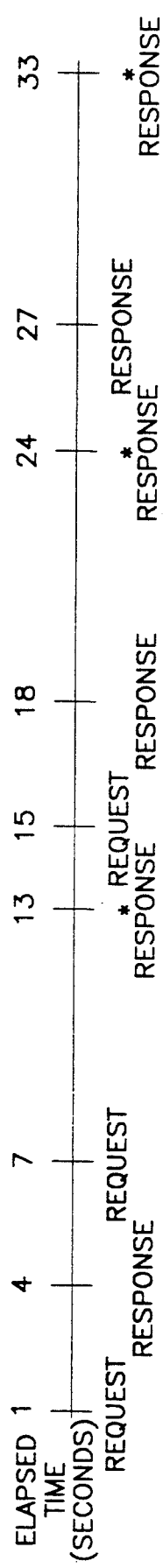
FIG. 1 shows a timeline of requests, responses and alarms.

FIG. 1 shows the operation of the warning timer 300 of the present invention during a period of time in which the user 360 sends to the computer 343 several requests and receives from the computer 343 several responses. The numbers above the horizontal line indicate seconds of elapsed time. The "*"s indicate the times at which the alarm generator 316 instructs the input/output device 362 to warn the user 360. Note that a response in FIG. 1 could be responsive to the request immediately preceding it, responsive to an earlier request, or unsolicited. In FIG. 1, it is assumed that the value of span 336 is five seconds, and that enabled_flag 334 indicates that the system is enabled.

Referring now to FIG. 1, at second 1, the user 360 sends a request which triggers the request time setter 312 (or 333, in the structure of FIG. 5). At second 4, the user 360 receives a response, which triggers the alarm generator 316 (or 377). Because less than five seconds (the value of span 336) elapsed between the triggering response at second 4 and the request immediately preceding it (at second 1), the alarm generator 316 (or 337) does not generate an alarm. The response at second 4 also triggers the response time setter 318 (or 335, in the structure of FIG. 5).

At second 7, the user 360 sends a request, which triggers the request time setter 312 (or 333). At second 13, the user 360 receives a response, which triggers the alarm generator 316 (or 337). Because more than five seconds elapsed between the response at second 13 and the request immediately preceding it (at second 7), the alarm generator 316 (or 337) generates an alarm, as indicated by the "*" at second 13. The response at second 13 also triggers the response time setter 318 (or 335).

At second 15, the user 360 sends a request, which triggers the request time setter 312 (or 333). At second 18, the user 360 receives a response, which triggers the alarm generator 316 (or 337). Because less than five seconds elapsed between the response at second 13 and the request immediately preceding it (at second 15), the alarm generator 316 (or 337) does not generate an alarm. The response at second 18 also triggers the response time setter 318 (or 335).

At second 24, the user 360 receives a response, which triggers the alarm generator 316 (or 337). Because more than five seconds elapsed between the response at second 24 and the response immediately preceding it (at second 18), the alarm generator 316 (or 337) generates an alarm, as indicated by the "*" at second 24. The response at second 18 also triggers the response time setter 318 (or 335).

At second 27, the user 360 receives a response, which triggers the alarm generator 316 (or 337). Because less than five seconds elapsed between the response at second 27 and the response immediately preceding it (at second 24), the alarm generator 316 (or 337) does not generate an alarm. The response at second 18 also triggers the response time setter 318 (or 335).

At second 33, the user 360 receives a response, which triggers the alarm generator 316. Because more than five seconds elapsed between the response at second 33 and the response immediately preceding it (at second 27), the alarm generator 316 (or 337) generates an alarm, as indicated by the "*" at second 33. The response at second 33 also triggers the response time setter 318 (or 335).

One implementation of the present invention is as a module of a window interface program of a computer system and method with windowing capabilities (called a windowing system). Specifically, the present invention could be implemented in a display server or a window manager. A display server is a portion of a window interface program which provides display capabilities and keeps track of user input. A window manager is a portion of a window interface program which is layered on top of a display server, and enables the user 360 to specify many operating characteristics of the windowing system.

A windowing system can simultaneously display multiple windows on the output means of the input/output device 362. Each window could, for example, display the text or graphics associated with one of the application programs running on the computer. The input means of the input/output device 362 (usually a keyboard and a mouse) is associated with exactly one window at any instant. The user 360 sends a request to a window by logically associating the input means with that window. The user 360 can do so without first waiting for responses to any requests made to other windows. Consequently, a plurality of windows could have outstanding requests which were sent at different times, and which will generally be responded to at different times.

On a windowing system, a separate instance of the warning timer 300 could be invoked when a new window is opened. Alternatively, an instance of the warning timer could be invoked upon starting an application program. The latter approach is desirable when running an application program which sends output to more than one window. Associated with each instance is a separate set of parameters. This facilitates, for example, enabling the user 360 to set message 338 differently for each instance so that he or she can easily determine the window or application associated with an alarm.

Each window on a computer with windowing capabilities has a number of configuration variables associated with it. The configuration variables are known by the window manager. Thus, if the present invention were implemented on a window manager, the default values 342 for the set of parameters associated with an instance of the warning timer 300 could be determined from the configuration variables of the window from which it was invoked. This facilitates, for example, having message 338 automatically set differently for each window.

Three modes of operation of the warning timer 300 may be envisioned in the implementation on the computer with windowing capabilities. The mode of operation is specified by the value of broadcast 340.

In a first mode of operation, the user 360 is assumed to be paying attention only to the window or application program with which he or she is interacting. Therefore, the request time setter 312 (or 333) and the response time setter 318 (or 335) are only triggered for an instance of the warning timer 300 upon requests to a window or from an application associated with that instance.

In a second mode of operation, the user 360 is assumed to pay attention to all windows or application programs if he or she is interacting with any window or application program. This assumption is generally valid in a situation where the windows are all visible and the user 360 can readily see new responses to any window. In the second mode, an indication of a request or a response associated with any window or application is broadcast to all instances of the warning timer 300. Therefore, the request time setter 312 (or 333) is triggered for an instance upon requests from any window or to any application, and the response time setter 318 (or 335) is triggered for an instance upon responses to any window or from any application.

A third mode of operation is a combination of the first and second modes. In the third mode of operation, requests are handled as in the first mode and responses are handled as in the second mode. Because the user 360 would typically obscure or iconify windows from which he or she was not actively making requests, the warning timer 300 operating in the third mode would typically generate alarms upon responses to obscured or iconified windows. The user 360 is thus assumed to pay attention to all visible windows if he or she is interacting with any window, and to no obscured or iconified windows. Therefore, in an instance of the warning timer 300 operating in the third mode, the request time setter 312 (or 333) is triggered upon requests to any window or from any application, and the response time setter 318 (or 335) is triggered for an instance upon responses associated with that instance.

The assumption of the third mode regarding which windows the user 360 pays attention to could also be realized by having two values associated with span 336. The first value could be associated with visible windows and the second could be associated with obscured or iconified windows. The second value would typically be set to zero.

Similarly, two values could be associated with both enabled_flag 334 and messages 338. The warning timer 300 could then be enabled only for obscured and iconified windows, and could generate a different alarm for obscured and iconified windows.

A second implementation of the present invention is on a multiprogramming computer system with an operating system which enables the user 360 to run programs in a background mode as well as a foreground mode. The background mode is a mode which facilitates batch processing of programs which do not require much user 360 attention. Application programs running in the background mode are analogous to application programs which send responses to obscured or iconified windows. The foreground mode is used for running application programs interactively. Application programs running in the foreground mode are analogous to application programs running in visible windows.

It may be desirable for span 336 to have one value for application programs running in the foreground mode and a second value for application programs running in the background mode. As with span 336 for obscured and iconified windows, span 336 for application programs running in the background mode would typically be set to zero. Similarly, enabled_flag 334 and message 338 could both have one value associated with application programs running in the foreground mode and one value associated with application programs running in the background mode.

There are various other practical implementations of the present invention. For example, it could be implemented as a module of an operating system which did not support a background mode, a module of an application program, a module of an input/output device 362, or a module of a telecommunications device such as a modem.

While the invention has been particularly shown and described with reference to preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. A computer method, adapted for use in an interactive data processing system, comprising the steps of:
   (1) determining a first elapsed time between when a user sends a request to the interactive data processing system and when the interactive data processing system sends the user a response;
   (2) alerting the user after determining said first elapsed time in step (1) if said first elapsed time exceeds a predetermined value; and
   (3) storing a parameter to indicate an operating characteristic, said parameter having a plurality of values associated with it, wherein one of said plurality of values determines said operating characteristic and is indicated by whether a window with which steps (1) and (2) are associated is visible, obscured or iconified.

2. A computer method, adapted for use in an interactive data processing system, comprising the steps of:
   (1) determining a first elapsed time between when a user sends a request to the interactive data processing system and when the interactive data processing system sends the user a response;
   (2) alerting the user after determining said first elapsed time in step (1) if said first elapsed time exceeds a predetermined value; and
   (3) storing a parameter to indicate an operating characteristic, said parameter having a plurality of values associated with it, wherein one of said plurality of variables determines said operating characteristic and is indicated by whether an application with which steps (1) and (2) is running in a foreground mode or a background mode.

3. A computer method, adapted for use in an interactive data processing system, comprising the steps of:
   (1) determining a first elapsed time between when a user sends a request to the interactive data processing system and when the interactive data processing system sends the user a response;
   (2) alerting the user after determining said first elapsed time in step (1) if said first elapsed time exceeds a predetermined value;
   (3) storing a parameter to indicate an operating characteristic; and
   (4) setting said parameter to a default value, wherein said default value is determined by configuration variables of a window with which steps (1) and (2) are associated.

4. A computer method, adapted for use in an interactive data processing system, wherein two application programs are operating simultaneously, comprising the steps of:
   (1) determining a first elapsed time between when a user sends a request associated with the first application program to the interactive data processing system and when the interactive data processing system sends the user a response associated with the first application program;
   (2) alerting the user after determining said first elapsed time in step (1) if said first elapsed time exceeds a predetermined value;
   (3) determining a second elapsed time between when a user sends a request associated with the second application program to the interactive data processing system and when the interactive data processing system sends the user a response associated with the second application program;
   (4) alerting the user when said second elapsed time exceeds a predetermined value; and
   (5) determining a third elapsed time between when the user sends a request associated with the first application program and when the interactive data processing system sends a response associated with the second application program.

5. The computer method of claim 4, further comprising the step of:
   (6) storing a parameter to indicate whether step (5) associated with the first application program considers requests and responses associated with the second application program in determining said third elapsed time.

6. A computer method, adapted for use in an interactive data processing system, wherein two application programs are operating simultaneously, comprising the steps of:
   (1) determining a first elapsed time between when a user sends a request associated with the first application program to the interactive data processing system and when the interactive data processing system sends the user a response associated with the first application program;
   (2) alerting the user after determining said first elapsed time in step (1) if said first elapsed time exceeds a predetermined value;
   (3) determining a second elapsed time between when a user sends a request associated with the second application program to the interactive data processing system and when the interactive data processing system sends the user a response associated with the second application program;
   (4) alerting the user when said second elapsed time exceeds a predetermined value; and
   (5) determining a third elapsed time between when the interactive data processing system sends a response associated with the first application program and when the interactive data processing system sends a response associated with the second application program.

7. A computer method, adapted for use in an interactive data processing system, wherein two windows are operating simultaneously, comprising the steps of:
   (1) determining a first elapsed time between when a user sends a request to the interactive data processing system via the first window and when the interactive data processing system sends the user a response via the first window;
   (2) alerting the user after determining said first elapsed time in step (1) if said first elapsed time exceeds a predetermined value;
   (3) determining a second elapsed time between when a user sends a request to the interactive data processing system via the second window and when the interactive data processing system sends the user a response via the second window;
   (4) alerting the user when said second elapsed time exceeds a predetermined value; and
   (5) determining a third elapsed time between when the user sends a request associated with the first window and when the interactive data processing system sends a response associated with the second window.

8. The computer method of claim 7, further comprising the step of:

(6) storing a parameter to indicate whether step (5) associated with said first window considers requests and responses associated with said second window in determining said third elapsed time.

9. A computer method, adapted for use in an interactive data processing system, wherein two windows are operating simultaneously, comprising the steps of:

(1) determining a first elapsed time between when a user sends a request to the interactive data processing system via the first window and when the interactive data processing system sends the user a response via the first window;

(2) alerting the user after determining said first elapsed time in step (1) if said first elapsed time exceeds a predetermined value;

(3) determining a second elapsed time between when a user sends a request to the interactive data processing system via the second window and when the interactive data processing system sends the user a response via the second window;

(4) alerting the user when said second elapsed time exceeds a predetermined value; and (5) determining a third elapsed time between when the interactive data processing system sends a response associated with the first window and when the interactive data processing system sends a response associated with the second window.

* * * * *